United States Patent [19]

Larkin et al.

[11] Patent Number: 4,754,484
[45] Date of Patent: Jun. 28, 1988

[54] CONVERTIBLE HANDSET/HEADSET FOR TELEPHONE

[75] Inventors: Wallace K. Larkin, Scotts Valley; Toni R. Stevens, Felton, both of Calif.

[73] Assignee: ACS Communications, Inc., Scotts Valley, Calif.

[21] Appl. No.: 898,951

[22] Filed: Aug. 21, 1986

[51] Int. Cl.[4] .................. H04M 1/03; H04M 1/04; H04M 1/05

[52] U.S. Cl. .................. 379/430; 379/419; 379/420; 379/433; 381/183; 381/187

[58] Field of Search .......... 179/156 R, 156 A, 100 R, 179/100 C, 100 D, 101-103, 146 R, 157, 178-179, 182 R-182 A; 2/208-209; D14/53, 36, 59-67; 379/422, 420, 424, 419, 426, 427, 430, 433, 434, 449, 450; 381/183, 187, 188, 205

[56] References Cited

U.S. PATENT DOCUMENTS

| | | | |
|---|---|---|---|
| 431,810 | 7/1890 | Hess | 2/209 |
| 493,245 | 3/1893 | Brown | 379/443 |
| 1,557,686 | 10/1925 | Hangerup | 379/430 |
| 2,025,398 | 12/1935 | Pocock et al. | 379/430 |
| 2,263,066 | 11/1941 | Benisek et al. | 379/185 |
| 2,360,027 | 10/1944 | Werner | 379/430 |
| 2,481,387 | 9/1949 | Bonecutter | 379/446 |
| 2,503,846 | 4/1950 | Shann | 379/430 |
| 2,686,231 | 9/1954 | Stevens | 2/209 |
| 2,854,523 | 9/1958 | Lewis | 379/449 |
| 3,225,147 | 12/1965 | Dollinger | 379/449 |
| 3,654,404 | 4/1972 | Hutchings | 379/450 |
| 3,908,200 | 9/1975 | Lundin | 2/209 |
| 4,092,502 | 5/1978 | Jones | 379/442 |
| 4,209,264 | 6/1980 | Hellberg | 2/209 |
| 4,420,657 | 12/1983 | Larkin | 379/430 |
| 4,445,005 | 4/1984 | Furuhashi | 2/209 |
| 4,455,457 | 6/1984 | Akira | 2/209 |
| 4,558,178 | 12/1985 | Yasuda et al. | 379/430 |
| 4,591,661 | 5/1986 | Benedetto et al. | 379/61 |
| 4,634,816 | 1/1987 | O'Malley et al. | 379/430 |

FOREIGN PATENT DOCUMENTS

| | | | |
|---|---|---|---|
| 2060888 | 6/1972 | Fed. Rep. of Germany | 379/433 |
| 984552 | 2/1965 | United Kingdom | |

Primary Examiner—Jin F. Ng
Assistant Examiner—Danita R. Byrd
Attorney, Agent, or Firm—Limbach, Limbach & Sutton

[57] ABSTRACT

A miniature telephone handset that is convertible into a headset for use in conjunction with a telephone base unit. The telephone handset includes a housing, a microphone mounted near one end of the housing, an earphone mounted near the other end of the housing, a cable for electrically connecting the microphone and the earphone to the telephone base unit, a bushing rotatably coupled to the housing near the earphone end, and a removable headband adapted for insertion into the bushing and operable for supporting the housing next to a user's head when used as a headset.

12 Claims, 3 Drawing Sheets

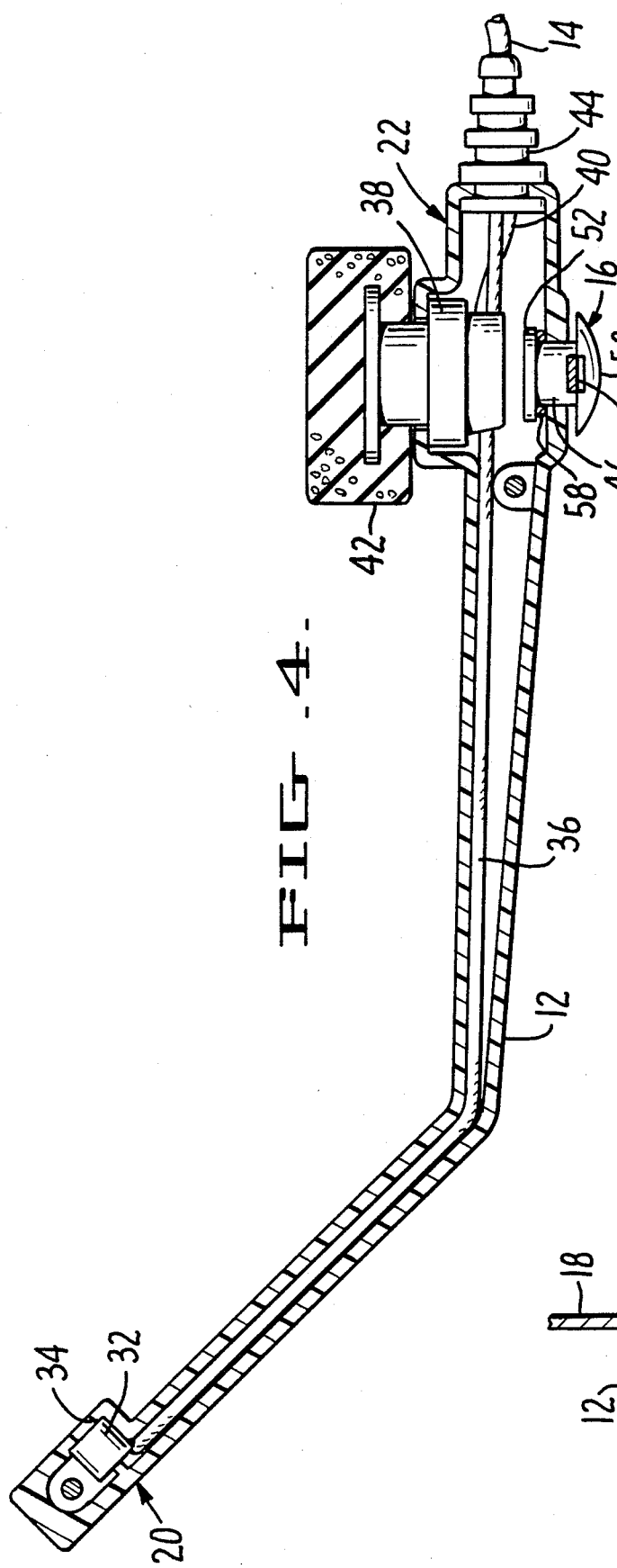
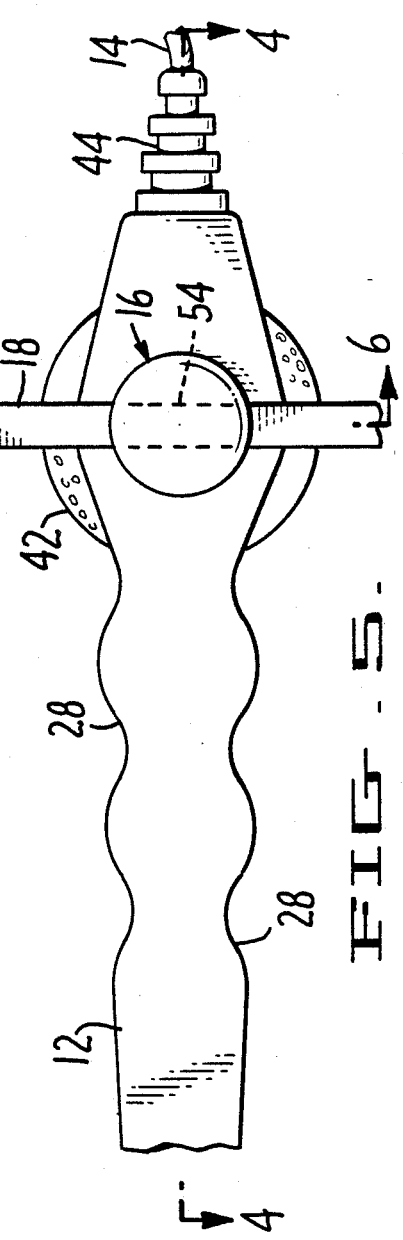
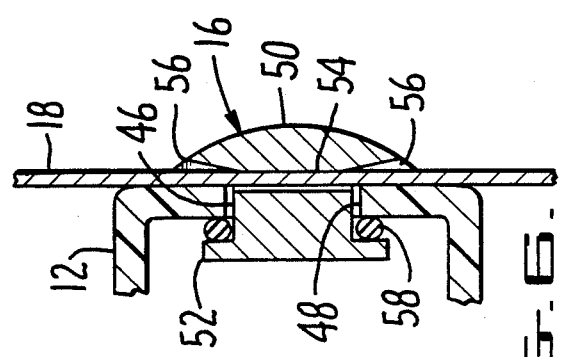

CONVERTIBLE HANDSET/HEADSET FOR TELEPHONE

BACKGROUND OF THE INVENTION

1. Field of the Invention

This invention relates generally to telephone equipment, and relates more particularly to a lightweight telephone handset that is convertible into a headset.

2. Description of the Relevant Art

A conventional telephone has a handset that a user picks up from a cradle when using the telephone. Such a handset is acceptable for occasional use, but may be unacceptable if the use is more frequent or extensive. A conventional handset is somewhat bulky because it is designed to be grasped by the user's hand. Because of the bulk, such a handset is relatively heavy and uncomfortable to use for extended periods of time. A conventional handset is also difficult to use if the user needs both hands free, in which case the handset must be awkwardly cradled between the user's chin and shoulder.

Lightweight headsets have overcome the drawbacks of the conventional handset for frequent telephone users. A headset is more comfortable for extended use than a conventional handset due to the headset's light weight. The headset also frees the user's hands for tasks other than supporting the handset. Such a headset typically has an earphone that is positioned next to one of the user's ears and a microphone positioned somewhere near the user's mouth. A headband or ear clip is used to attach the headset to the user.

While headsets have solved many of the problems of the frequent user of telephones, they have created additional problems. Because a headset is somewhat of a bother to put on, it is best used in situations where the user is continuously, rather than occasionally, using the telephone. For the occasional user, a combination of a handset and a headset separately connected to a single telephone base unit has been viewed as an adequate compromise between the comfort of the headset during extended use and the convenience of the handset during occasional use. Such a combination telephone is, of course, more expensive than a telephone equipped with either a handset or a headset alone. Apart from the additional cost of the headset are costs associated with an electric switch that permits the user to switch between using the handset and using the headset.

SUMMARY OF THE INVENTION

In accordance with the illustrated preferred embodiment, the present invention provides a miniature telephone handset that is convertible into a headset, for use in conjunction with a telephone base unit. The telephone handset includes a housing, a microphone mounted near one end of the housing, an earphone mounted near the other end of the housing, a cable for electrically connecting the microphone and the earphone to the telephone base unit, a bushing coupled to the housing near the earphone end, and a headband adapted for insertion into the bushing and operable for supporting the housing next to a user's head when used as a headset.

Preferably, the bushing is rotatably coupled to the housing and the headband is slidably coupled to the bushing, thus allowing the headband and housing to be adjusted to position the headset properly for each user. The adjustability of the headband and bushing allows the headset to be worn on either the left side or the right side of the user's head. In one embodiment of the invention, the headband folds away and nests against the housing during use as a handset.

Various features of the present invention combine to provide a new and useful telephone handset. One feature is that the headset of the present invention is easily convertible between a handset configuration and a headset configuration, and can, thus, replace both the handset and add-on headset of conventional combination-type telephones. Another feature is that the conversion between use as a handset and use as a headset is entirely mechanical, rather than through an electrical switch, for improved reliability and reduced cost. Another feature is that the handset is lightweight because it is designed to be grasped by the user's fingers, rather than by the user's hand. Still another feature is the adjustability of the headband, which allows the headset to be comfortably used by anyone. A major advantage of the present invention is that, due to reduced complexity, telephones incorporating the present invention will be less costly and easier to use than telephones having separate handsets and headsets.

The features and advantages described in the specification are not all inclusive, and particularly, many additional features and advantages will be apparent to one of ordinary skill in the art in view of the drawings, specification and claims hereof. Moreover, it should be noted that the language used in the specification has been principally selected for readability and instructional purposes, and may not have been selected to delineate or circumscribe the inventive subject matter. More specifically, the term "handset" is used herein to describe the present invention regardless of its particular configuration as an instrument grasped by the user's fingers (handset) or as an instrument attached to the user's head (headset). Accordingly, resort to the claims is necessary in order to determine such inventive subject matter.

BRIEF DESCRIPTION OF THE DRAWINGS

FIG. 4 is a sectional view of the handset, as taken along section line 4—4 of FIG. 5.

FIG. 5 is a side elevation detail view of the handset.

FIG. 6 is a sectional detail view of the handset illustrating the installation of a bushing thereof, as taken along section line 6—6 of FIG. 5.

DETAILED DESCRIPTION OF THE PREFERRED EMBODIMENT

Figure 2:
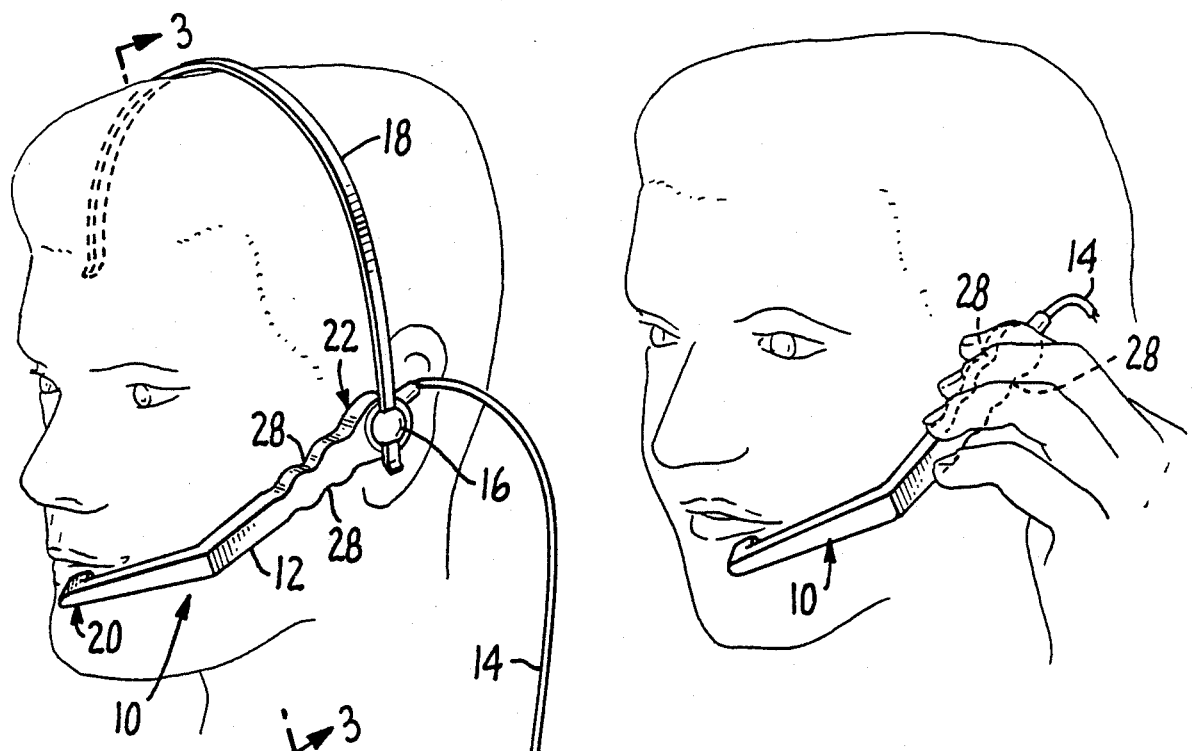
FIG. 2 is a perspective view of the handset in use as a handset.
Figure 1:
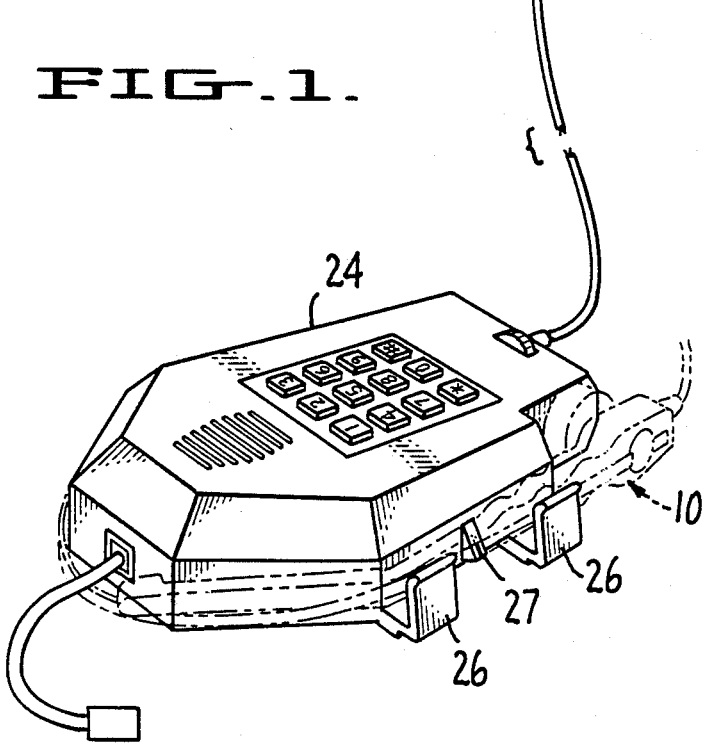
FIG. 1 is a perspective view of a handset, according to the present invention, in use as a headset.

FIGS. 1 through 9 of the drawings depict various preferred embodiments of the present invention for purposes of illustration only. One skilled in the art will readily recognize from the following discussion that alternative embodiments of the structures and methods illustrated herein may be employed without departing from the principles of the invention described herein.

The preferred embodiment of the present invention is a telephone having a miniature, lightweight handset that is convertible into a headset. As shown configured as a headset in FIG. 1, the handset 10 includes a housing 12, a cable 14, a bushing 16, and a removable headband 18. The housing 12 contains a microphone positioned at one end 20 thereof and an earphone positioned at the other end 22 thereof. The cable 14 electrically connects the microphone and earphone to a telephone base unit 24. When the handset 10 is not in use, it rests in a cradle 26 of the telephone base unit 24 and activates a hook switch 27 thereof. The bushing 16, which is coupled to the housing 12 near the earphone end 22 thereof, provides means for coupling the removable headband 18 to the housing.

As shown in FIG. 2, the handset 10 without the headband 18 may be grasped by the fingers of the user for use as a handset. The housing 12 near the second end 22 thereof is configured with contours 28 along the top and bottom surfaces to assist the user in grasping the handset 10.

Figure 3:
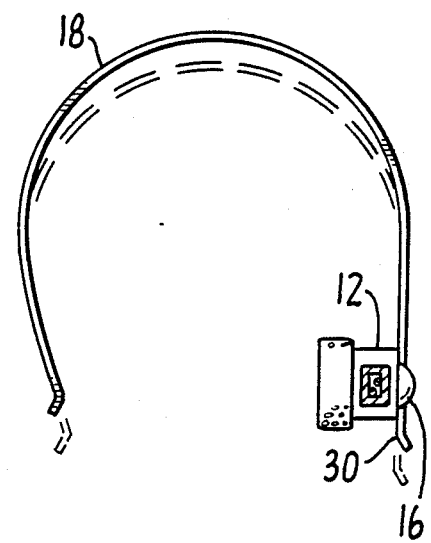
FIG. 3 is a front elevation sectional view of the handset, as taken along section line 3—3 of FIG. 1.

The bushing 16 allows the headband 18 to be adjusted to fit the user. As shown in FIG. 3, when the headband 18 is installed for configuring the handset 10 as a headset, the headband can be adjusted to fit the user by sliding end 30 of the headband relative to the bushing 16. As described below, the bushing 16 is rotatably coupled to the housing 12, so that the headband 18 can be rotated with respect to the housing to further adjust the headset to fit the user.

The housing 12 is preferably a two-piece assembly of molded plastic. As shown in FIGS. 4, 5, and 6, the microphone 32 is placed at end 20 of the housing 12 adjacent to a hole 34 that acoustically connects the microphone to the outside of the housing. A wire 36 electrically connects the microphone 32, via cable 14, to the telephone base unit 24. The earphone 38 is placed at end 22 of the housing 12, and is electrically connected to the telephone base unit 24 by a wire 40, which also forms part of the cable 14. A foam cushion 42 is attached to the outside of the earphone 38 for user comfort. A cable boot 44, preferably composed of molded rubber, extends from end 22 of the housing 12 for protecting the cable 14 against breakage.

Opposite the earphone 38 at end 22 of the housing 12 is located the bushing 16. As best seen in FIG. 6, the bushing 16 includes a cylindrical barrel 46 that is positioned within a hole 48 in the housing 12, a cap 50 having a diameter greater than the hole 48 and positioned outside the housing, and a lip 52 also having a diameter greater than the hole 48, but positioned inside the housing. The bushing 16 also has a cavity 54 extending therethrough and disposed between the barrel 46 and the cap 50 for receiving the headband 18. Both entrances 56 to the cavity 54 are tapered to facilitate the insertion of the headband 18 in either direction into the bushing 16. The bushing 16 is preferably a molded plastic piece.

An O-ring 58 is positioned on the barrel 46 of the bushing 16 between the lip 52 thereof and the housing 12. The bushing 16 is designed so that the insertion of the headband 18 into the cavity 54 moves the bushing 16 outwardly by a small distance to compress the O-ring 58. The compressed O-ring 58 impedes the rotation of the bushing 16 and the headband 18 with respect to the housing 12 by increasing the torque needed to rotate the bushing. The bushing 16 can be rotated to position the headband 18 properly for the user, but once rotated, the O-ring 58 tends to lock the bushing in place to prevent the bushing from rotating from the desired position. The bushing 16 thus provides a rotatable coupling for attachment of the headband 18 to the housing 12, while the O-ring 58 provides a small locking force opposing both the rotation of the bushing and headband relative to the housing and the translation of the headband relative to the bushing and housing. The compressibility of the O-ring 58 accommodates normal production tolerances in the fabrication of the housing 12 and the bushing 16.

In order to relocate the headset to a position on the other side of the user's head, either the bushing 16 and headband 18 can be rotated by about one half of a revolution, or the headband can be removed and inserted into the cavity 54 from the other side of the bushing.

Figure 7:
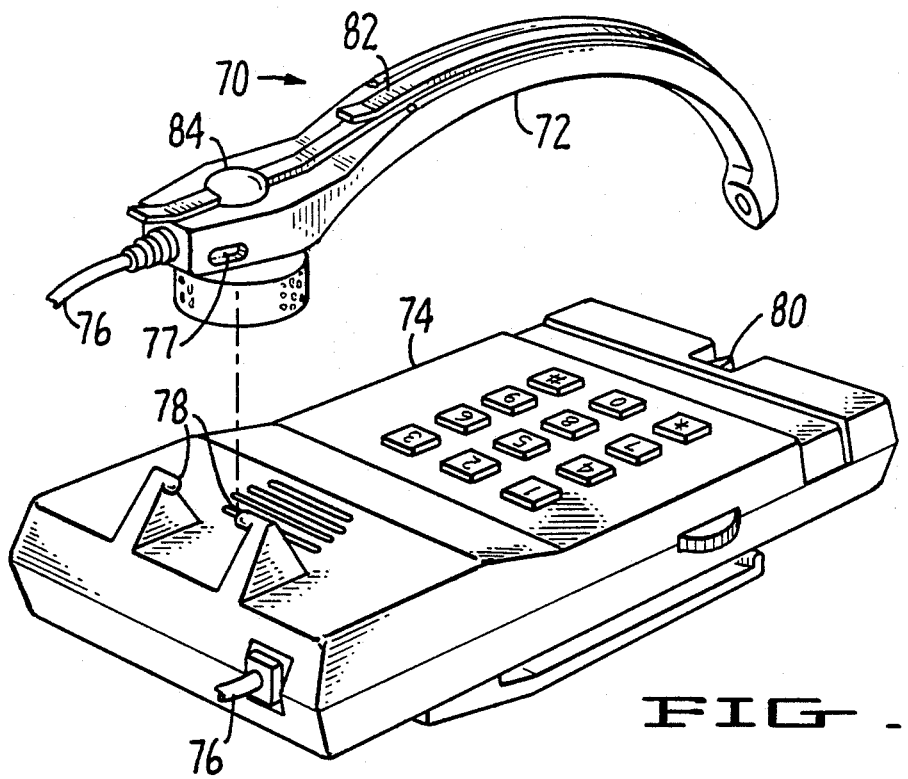
FIG. 7 is a perspective view of an alternative embodiment of the handset of the present invention.
Figure 9:
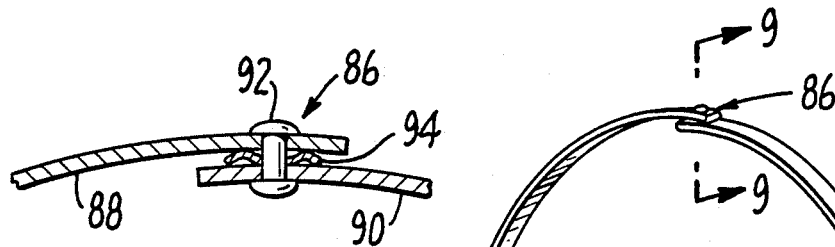
FIG. 9 is a sectional detail view of a pivot joint of the headband of the handset of FIG. 7, as taken along section line 9—9 of FIG. 8.
Figure 8:
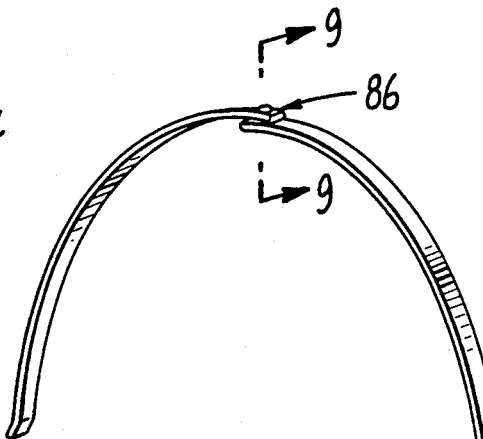
FIG. 8 is a perspective view of the handset of FIG. 7, as configured for use as a headset.

An alternative embodiment of the present invention is shown in FIGS. 7, 8, and 9. A handset 70 includes a housing 72 containing a microphone and earphone that is coupled to a telephone base unit 74 via a cable 76. When the handset 70 is on-hook, two depressions 77 in the earphone end engage two tabs 78 on the base unit 74, while the microphone end activates a hook switch 80 of the base unit. The handset 70 is shown in FIG. 7 in a handset configuration, with a headband 82 folded and nested against the outer contour of the handset. The headband 82 is coupled to the housing 72 by a bushing 84, in the same manner as headband 18 is coupled to the housing 12 by the bushing 16, described above.

In this alternative embodiment of the present invention, the headband 82 includes a pivot 86 located near the crown thereof, which allows the headband to be folded over into a generally quarter-circular shape. The pivot 86 joins two halves 88 and 90 of the headband, and consists of a rivet 92 that engages holes in the two halves of the headband and a spring washer 94 that is disposed between the two halves of the headband, as shown in FIG. 9.

When the handset 70 is configured for use as a headset, the headband 82 is positioned as shown in FIG. 8, with the headband rotated out and away from the housing 72 and with the two halves 88 and 90 of the headband opened up to form a semicircular shape. When the handset 70 is configured for use as a handset, the headband 82 is positioned as shown in FIG. 7, with the two halves 88 and 90 folded together and with the folded headband positioned in a groove 96 (FIG. 8) in the outer contour of the housing. Thus, when configured as a handset, the headband 82 is flush mounted with the outer contour of the housing 72. In this alternative embodiment, the headband 82 need not be detached from the housing 72 when the handset 70 is configured as a handset.

From the above description, it will be apparent that the invention disclosed herein provides a novel and advantageous miniature telephone handset that is convertible into a headset. The foregoing discussion discloses and describes merely exemplary methods and embodiments of the present invention. As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

What is claimed is:

1. A telephone handset for use in conjunction with a telephone base unit, said telephone handset comprising:
a housing having a rigid shell and having a hole through the shell at a first end of said housing;
a microphone coupled to a second end of said housing;
an earphone coupled to the first end of said housing on a side of said housing opposite from said hole;
cable means for electrically connecting said microphone and said earphone to the telephone base unit;
coupling means for pivotably coupling a headband to said housing, wherein said coupling means includes a bushing having a barrel that is positioned and rotatable within said hole, having end caps at both ends of said barrel that extend outwardly of said hole to retain said bushing in said hole, and having a cavity extending transversely through the bushing at a location external to said housing, wherein said cavity is operable for receiving and frictionally retaining a strip of material; and
a headband composed of a strip of material and adapted for insertion into said cavity of said coupling means, wherein said headband is operable for supporting said housing next to a user's head.

2. A telephone handset as recited in claim 1 wherein said housing includes a contoured outer surface for grasping.

3. A telephone handset as recited in claim 1 wherein said coupling means further comprises an O-ring disposed between an interior one of said end caps and the shell of said housing and operable for impeding the rotation of said bushing and said headband with respect to said housing.

4. A telephone handset as recited in claim 3, wherein said headband is slidably coupled to said bushing, and wherein the insertion of said headband into said bushing compresses said O-ring to impede the translation of said headband with respect to said bushing and said housing.

5. A telephone handset as recited in claim 1 wherein said cavity of said bushing is operable for receiving said headband from either side thereof.

6. A telephone handset as recited in claim 1 wherein said headband has a generally semicircular shape with one leg of said headband adapted for insertion into said bushing, and wherein said headband includes a pivot near the crown thereof that allows said headband to be folded into a generally quarter-circular shape.

7. A telephone handset as recited in claim 6 wherein said headband can be rotated with respect to said housing, and wherein said folded headband can be positioned in alignment with said housing.

8. A telephone handset as recited in claim 7 wherein said housing has an outer contour that is similar to the shape of the folded headband, and wherein said folded headband is operable for nesting against said outer contour of said housing.

9. A telephone handset as recited in claim 1 wherein said headband is removable from said bushing.

10. A telephone handset for use in conjunction with a telephone base unit, said telephone handset comprising:
a housing having a rigid shell and having a hole through the shell at a first end of said housing;
a microphone coupled to a second end of said housing;
an earphone coupled to the first end of said housing on a side of said housing opposite from said hole;
cable means for electrically connecting said microphone and said earphone to the telephone base unit;
coupling means for pivotably coupling a headband to said housing, wherein said coupling means includes a bushing having a barrel that is positioned and rotatable within said hole, having end caps at both ends of said barrel that extend outwardly of said hole to retain said bushing in said hole, and having a cavity extending transversely through the bushing at a location external to said housing, wherein said cavity is operable for receiving and frictionally retaining a strip of material, wherein said coupling means further includes an O-ring disposed between an interior one of said end caps and the shell of said housing and operable for impeding the rotation of said bushing with respect to said housing; and
a removable headband composed of a strip of material and adapted for insertion into said cavity of said coupling means, wherein said head is operable for supporting said housing next to a user's head.

11. A telephone comprising:
a telephone base unit; and
a telephone handset for use in conjunction with a telephone base unit, wherein said telephone handset includes a housing having a rigid shell and having a hole through the shell at a first end of said housing, a microphone coupled to a second end of said housing, an earphone coupled to the first end of said housing on a side of said housing opposite from said hole, cable means for electrically connecting said microphone and said earphone to said telphone base unit, coupling means for pivotably coupling a headband to said housing, wherein said coupling means includes a bushing having a barrel that is positioned and rotatable within said hole, having end caps at both ends of said barrel that extend outwardly of said hole to retain said bushing in said hole, and having a cavity extending transversely through the bushing at a location external to said housing, wherein said cavity is operable for receiving and frictionally retaining a strip of material, and a headband composed of a strip of material and adapted for insertion into said cavity of said coupling means, wherein said headband is operable for supporting said housing next to a user's head.

12. A telephone as recited in claim 11 wherein said telephone base unit includes two tabs and a hook switch, and wherein one end of said telephone handset is adapted for engaging said tabs and the other end of said handset is adapted for actuating said hook switch when said handset is placed on hook.

* * * * *